United States Patent [19]

Toyoda et al.

[11] Patent Number: 5,130,515
[45] Date of Patent: Jul. 14, 1992

[54] CONTROL METHOD FOR ARC WELDING ROBOT

[75] Inventors: Kenichi Toyoda, Hino; Toru Mizuno, Tama; Hirotsugu Kaihori, Hino, all of Japan

[73] Assignee: Fanuc Ltd., Yamanashi, Japan

[21] Appl. No.: 724,459

[22] PCT Filed: Mar. 7, 1988

[86] PCT No.: PCT/JP88/00241

§ 371 Date: Aug. 24, 1988

§ 102(e) Date: Aug. 24, 1988

[87] PCT Pub. No.: WO88/06936

PCT Pub. Date: Sep. 22, 1988

Related U.S. Application Data

[63] Continuation of Ser. No. 544,806, Jun. 28, 1990, abandoned, which is a continuation of Ser. No. 256,882, Aug. 24, 1988, abandoned.

[30] Foreign Application Priority Data

Mar. 20, 1987 [JP] Japan ............................. 62-64185

[51] Int. Cl.⁵ ............................................. B23K 9/12
[52] U.S. Cl. .................................. 219/125.12; 901/42
[58] Field of Search ................... 219/125.12; 901/42

[56] References Cited

U.S. PATENT DOCUMENTS

| 4,150,329 | 4/1979 | Dahlstrom | 219/125.12 |
| 4,179,602 | 12/1979 | Maruyama et al. | 219/125.1 |
| 4,590,577 | 5/1986 | Nio et al. | |
| 4,621,333 | 11/1986 | Watanabe | 219/125.12 |

FOREIGN PATENT DOCUMENTS

| 76498 | 4/1983 | European Pat. Off. . |
| 0146085A3 | 6/1985 | European Pat. Off. . |
| 52-11950 | 4/1977 | Japan . |
| 52-13782 | 4/1977 | Japan . |
| 57-11749 | 3/1982 | Japan . |
| 58-221673 | 6/1982 | Japan . |
| 58-154459 | 9/1983 | Japan . |

Primary Examiner—Clifford C. Shaw
Attorney, Agent, or Firm—Armstrong, Nikaido, Malmelstein, Kubovcik & Murray

[57] ABSTRACT

One cycle of a weaving pattern suitable for the shape and material of the base metal to be welded is taught and stored, and a welding torch is made to weave in accordance with the suitable weaving pattern. Consequently, arc welding can be carried out by using a weaving pattern suitable for a shape and a material of each base metal.

4 Claims, 3 Drawing Sheets

CONTROL METHOD FOR ARC WELDING ROBOT

This application is a continuation of U.S. Ser. No. 544,806, filed Jun. 28, 1990 abandoned which is a continuation of U.S. Ser. No. 256,882, filed on Aug. 24, 1988 abandoned.

TECHNICAL FIELD

The present invention relates to a control method for an arc welding robot, more particularly, to a control method for an arc welding robot for performing arc welding by weaving a welding torch along a weld line of a base metal.

BACKGROUND ART

An arc welding robot for automatically performing arc welding using an industrial robot has been researched and developed. This arc welding robot carries out arc welding automatically by weaving a welding torch mounted at a hand portion of the robot along a weld line of a base metal (weld member).

To this end, patterns for movement of the welding torch are previously stored to memory unit of the robot, the user selects a suitable weaving pattern from the stored pattern, and the arc welding is carried out in accordance with the selected weaving pattern. However, in the conventional control method for the arc welding robot, weaving patterns which can be used by the user are limited to the basic weaving patterns which are previously stored in the arc welding robot. Therefore, it is difficult to carry out arc welding by weaving the welding torch in accordance with a weaving pattern suitable for a shape and a material of each base metal.

DISCLOSURE OF THE INVENTION

The object of the present invention is to carry out arc welding by using a weaving pattern suitable for a shape and a material of each base metal.

According to the present invention, there is provided a control method for an arc welding robot for performing arc welding by weaving a welding torch along a weld line of a base metal, characterized in that the control method for the arc welding robot comprises: a weaving pattern teaching step for teaching one cycle of a weaving pattern suitable for a shape and a material of the base metal; a weaving pattern storing step for storing the taught weaving pattern; and an arc welding performing step for performing arc welding by weaving the welding torch in accordance with the stored weaving pattern, when the stored weaving pattern is appointed.

According to the control method for the arc welding robot having the above configuration, one cycle of a weaving pattern suitable for a shape and a material of the base metal is taught by the weaving pattern teaching step, and the taught weaving pattern is stored by the weaving pattern storing step. When the stored weaving pattern is appointed, the arc welding is performed by weaving the welding torch in accordance with the stored weaving pattern by the arc welding performing step, and consequently, the arc welding can be carried out by using a weaving pattern suitable for a shape and a material of each base metal.

BEST MODE FOR CARRYING OUT THE INVENTION

First, the problems of a method used for an arc welding robot according to a prior art will be explained, followed by an explanation of a method used for an arc welding robot according to the present invention.

Figure 1:
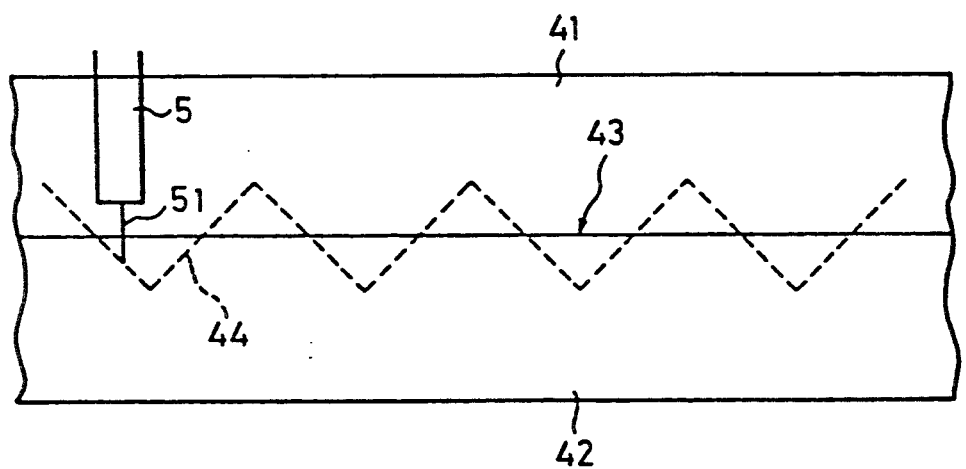
FIG. 1 is a diagram showing an example of a weaving pattern stored previously to a conventional arc welding robot.

FIG. 1 is a diagram showing an example of a weaving pattern stored previously to a conventional arc welding robot. As shown in FIG. 1, in a control of the conventional arc welding robot, a weld member 41 is connected to a weld member 42 at a weld line 43 by weaving a welding torch 5 in accordance with a zigzag weaving pattern 44, and melting a welding wire 51. These patterns for weaving the welding torch are previously stored and the user selects a specific weaving pattern from the stored patterns in the arc welding robot. That is, in the conventional arc welding robot, some welding patterns are previously stored, and the user selects and uses a suitable weaving pattern from the stored patterns. But, the previous stored weaving patterns in the arc welding robot are limited to basic weaving patterns such as a zigzag pattern, a triangular pattern, or a sine wave pattern.

Note, the weaving movement of the weaving torch should be determined by a suitable pattern, taking into consideration the shape and material of the welding base metal. But, in the conventional control method for the arc welding robot, the weaving patterns which can be used by the user are limited to two types of basic weaving patterns which are previously stored in the arc welding robot. Therefore, it is difficult to carry out arc welding by weaving the welding torch in a weaving pattern suitable for the shape and material of each base metal.

Below, an example of a control method for an arc welding robot according to the present invention will be explained with reference to the drawings.

Figure 2:
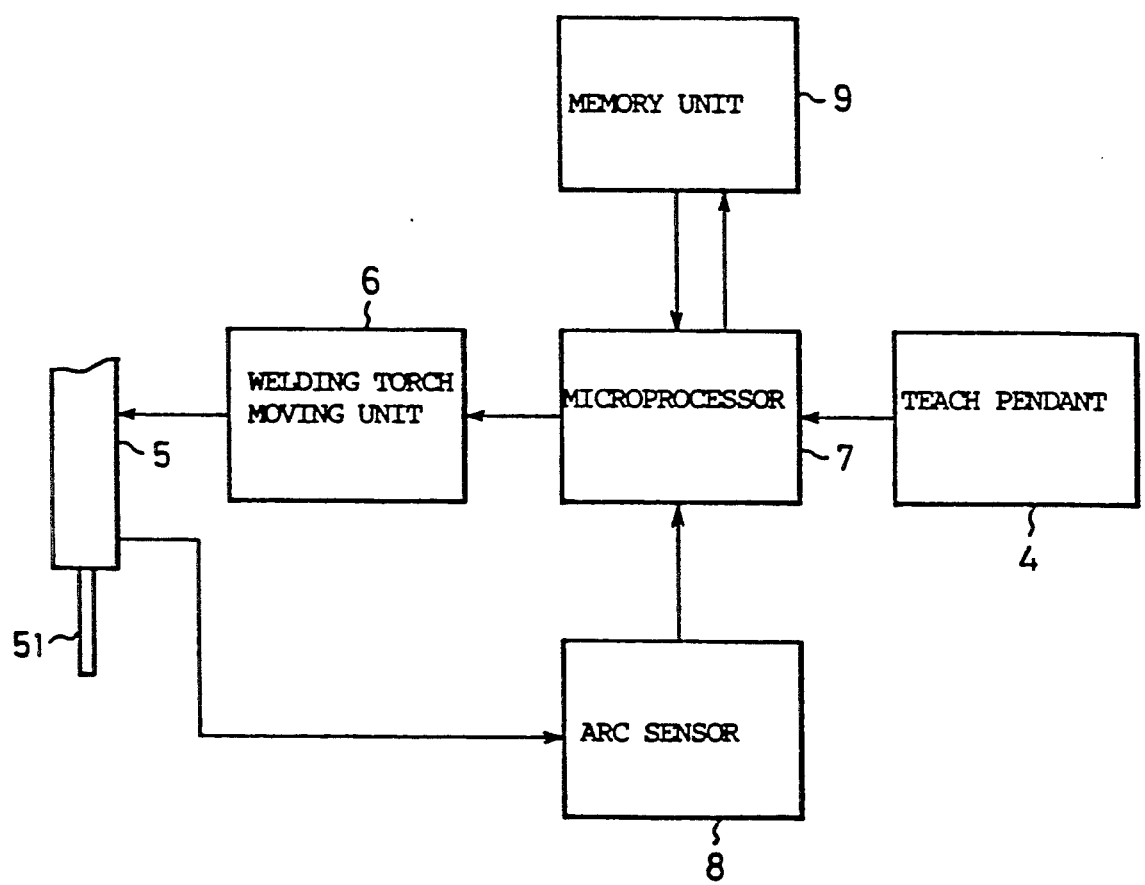
FIG. 2 is a schematic diagram showing an example of an arc welding robot using a control method for an arc welding robot of the present invention.

FIG. 2 is a schematic diagram showing an example of an arc welding robot using a control method for an arc welding robot of the present invention When a welding torch 5 is carrying out arc welding of a base metal while transferring a welding wire 51, an arc between a tip of the welding wire 51 and the base metal is generated by a voltage applied from a power supply (not shown in the drawing). An arc current flowing between the tip of the welding wire 51 and the base metal is detected by an arc sensor 8, and the detected data of the current flow is supplied to a microprocessor 7. The welding torch 5 is moved by a welding torch moving unit 6 controlled by commands of the microprocessor 7, so that the weaving action along a weld line of the base metal of the welding torch 5 is carried out by the welding torch moving unit 6.

The microprocessor 7 receives data from a teach pendant 4, and the user inputs commands and data from the teach pendant 4 to actually move the welding torch 5 to a specific weaving position, so that a weaving pattern is stored to a memory unit 9. Basic weaving patterns of a zigzag or a sine wave are also stored in the memory unit 9, as for the conventional arc welding robot.

Figure 3:
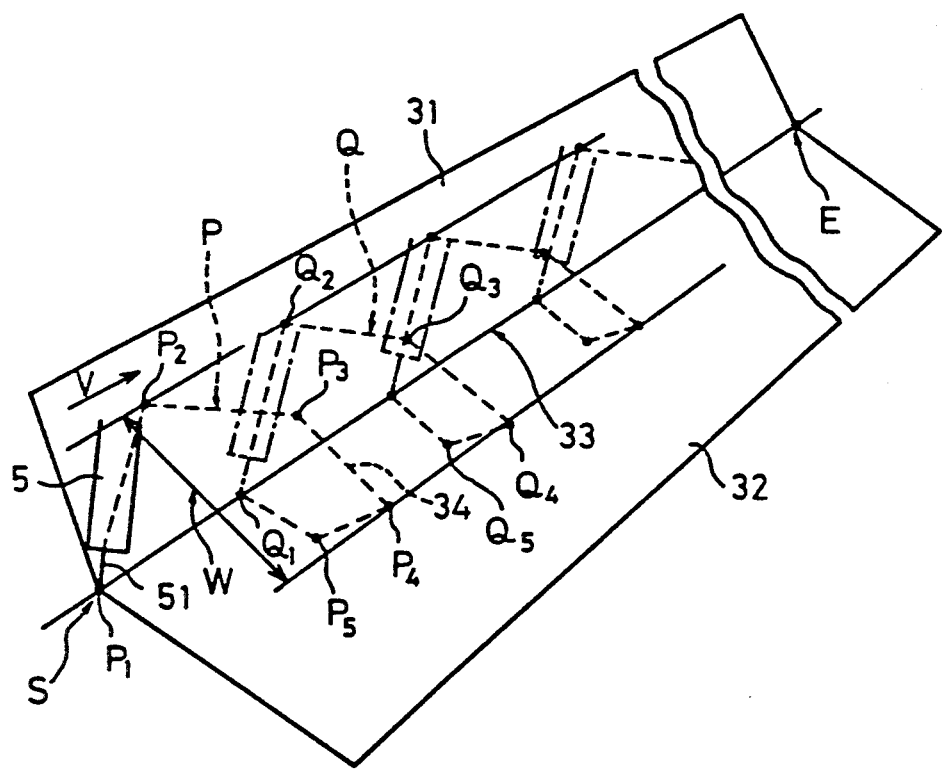
FIG. 3 is a diagram showing an example of a weaving pattern taught by a control method for an arc welding robot of the present invention.

FIG. 3 is a diagram showing an example of a weaving pattern taught by a control method for an arc welding robot for the present invention.

Below, a control method for an arc welding robot of the present invention will be explained with reference to FIGS. 2 and 3.

First, the user operates the teach pendant 4 to move the tip of the welding wire 51 of the welding torch 5 to a point $P_1$, the welding torch 5 is mounted at a hand portion of an arc welding robot, so that the point $P_1$ is taught to the robot. Similarly, the tip of the welding wire is moved to points $P_2$, $P_3$, $P_4$, and $P_5$ respectively, and the points $P_2$, $P_3$, $P_4$, and $P_5$ are taught to the arc welding robot. One cycle of a weaving pattern 34 is determined by these points $P_1$, $P_2$, $P_3$, $P_4$, and $P_5$, and the weaving pattern 34 is stored to the memory unit 9. In this manner, various weaving patterns desired by the user can be stored to the memory unit 9.

When arc welding is performed by the above stored weaving pattern 34, the weaving pattern 34 determined by the points $P_1 - P_5$ is read out in the same way as the previously stored weaving patterns, and the arc welding is performed by weaving a welding torch 5 along the weaving pattern 34. Note, the user appoints the weaving pattern 34 and inputs a start point S for starting a weaving action and the arc welding, an end point E for stopping the weaving action and ending the arc welding, an amplitude W of the weaving pattern, and a speed value V at which the welding torch 5 is moved, so that the arc welding is carried out in accordance with the above specific conditions.

In FIG. 3, points $Q_1 - Q_5$ indicate a cycle Q which is a next cycle and is the same pattern as the cycle P determined by the points $P_1 - P_5$ in the weaving pattern 34, wherein the points $Q_1 - Q_5$ correspond to the points $P_1 - P_5$, respectively. The weaving torch 51 is made to weave along a weld line 33 from the start point S to the end point E in accordance with the weaving pattern 34. Furthermore, an amplitude of the weaving torch 5 is determined by the amplitude W, and a speed at which the weaving torch 5 is moved is determined by the speed value V.

Accordingly, the arc welding of the welding member 31 and the welding member 32 is performed by using the weaving pattern 34 suitable for the shape and material of each welding member.

In the above explanation, the teaching of the welding pattern is carried out by a teach pendant by actually moving the welding torch practically by a teach pendant, but it is also possible to supply specific data for a weaving pattern without actually moving the welding torch.

While the invention has been particularly shown and described in reference to preferred embodiments thereof, it will be understood by those skilled in the art that changes in form and details may be made therein without departing from the spirit and scope of the invention.

We claim:

1. A control method for an arc welding robot for performing arc welding by weaving a welding torch along a weld line of a base metal, said control method for said arc welding robot comprising the steps of:
   teaching said arc welding robot one cycle of a weaving pattern formed by a plurality of points in a three-dimensional coordinate system and movement characteristics of said welding torch selected for a given shape and a given material of said base metal, said step of teaching includes the steps of independently inputting an amplitude defined by the distance between two points, a cumulative constant travel speed along said weld line of said base metal, and a set of points in said three-dimensional coordinate system defining said weaving pattern for said welding torch;
   storing said one cycle of said weaving pattern in said arc welding robot; and
   performing arc welding by weaving said welding torch, by repeating said one cycle of said weaving pattern while moving said torch along said weld line.

2. A method according to claim 1, wherein said weaving pattern teaching step carries out the teaching of the weaving pattern by performing at least one of the steps of actually moving the welding torch, and inputting each point of movement of the welding torch.

3. A method according to claim 1, wherein said weaving pattern teaching step carries out the teaching of the weaving pattern by providing data for a specific weaving pattern, without actually moving the welding torch.

4. A method according to claim 1, wherein said arc welding performing step carries out the arc welding by appointing the weaving pattern, and by inputting a start point, and an end point.

* * * * *